United States Patent [19]
Dressen et al.

[11] Patent Number: 5,601,188
[45] Date of Patent: Feb. 11, 1997

[54] SECURITY PACKAGE WITH INTERNAL POCKET FOR A SURVEILLANCE TAG

[75] Inventors: Larry Dressen, Waconia; Barry Gregerson, Deephaven, both of Minn.

[73] Assignee: Emplast, Inc., Shakopee, Minn.

[21] Appl. No.: 634,444

[22] Filed: Apr. 18, 1996

[51] Int. Cl.⁶ .......................... B65D 85/57; B65D 85/575
[52] U.S. Cl. .................. 206/308.2; 206/307; 206/387.11; 206/807; 206/459.1; 206/459.5
[58] Field of Search ............................. 206/1.5, 307, 309, 206/308.2, 387.11, 807, 459.1, 459.5

[56] References Cited

U.S. PATENT DOCUMENTS

| | | |
|---|---|---|
| 4,047,410 | 9/1977 | Close . |
| 4,381,836 | 5/1983 | Rivkin et al. ................ 206/387.11 |
| 4,716,745 | 1/1988 | Hehn . |
| 4,805,769 | 2/1989 | Soltis et al. ................ 206/308.2 |
| 4,834,238 | 5/1989 | Hehn et al. . |
| 4,865,190 | 9/1989 | Gregerson et al. . |
| 5,211,283 | 5/1993 | Weisburn et al. . |
| 5,215,189 | 6/1993 | Weisburn et al. . |
| 5,297,672 | 3/1994 | MacTavish ................ 206/308.2 |
| 5,375,708 | 12/1994 | Wittman . |
| 5,375,712 | 12/1994 | Weisburn . |
| 5,460,266 | 10/1995 | Mundorf et al. . |

*Primary Examiner*—Jimmy G. Foster
*Attorney, Agent, or Firm*—Haugen and Nikolai, P.A.

[57] ABSTRACT

A security package having a locking mechanism capable of securely encompassing an audio cassette, a video cassette, compact disc, or the like within the security package, wherein the security package has an internally disposed pocket for receiving an electronic article surveillance (EAS) tag therewithin. The EAS cavity or pocket is completely sealed and tamper-proof while in the audio-video article is locked within the security package and the locking mechanism does not interfere or intrude within the EAS cavity.

15 Claims, 11 Drawing Sheets

SECURITY PACKAGE WITH INTERNAL POCKET FOR A SURVEILLANCE TAG

BACKGROUND OF THE INVENTION

I. Field of the Invention

The present invention relates generally to a security package for audio cassettes, video cassettes, compact discs, and the like. More particularly, the present invention relates to a security package of unibody construction having a locking mechanism capable of securely encompassing such audio-visual articles within the security package, as well as an internally disposed pocket for receiving an electronic article surveillance (EAS) tag therewithin.

II. Discussion of the Prior Art

In an effort to thwart or eliminate the theft of audio cassettes, video cassettes, compact discs, and the like, retailers have for years worked toward producing packages for such articles having improved security characteristics. Due to the relatively compact size of such audio-visual articles, many of the anti-theft efforts to date have focused upon securing the audio-visual article within a housing or package of increased size. The increased size of the security package, it is found, presents a potential thief with greater difficulty in concealing the security package during flight from the premises. While effectively reducing the degree to which such audio-visual articles are stolen, a significant number of audio cassettes, video cassettes, compact discs, and the like still fall victim to cunning shoplifters who successfully secrete and abscond with such prior art security packages notwithstanding the increased size. Due to the high prices of such audio-visual articles, these losses become expensive for retailers and are significant even if only a few are stolen per month.

To further reduce the likelihood of thievery, some of the aforementioned prior art security packages include electronic article surveillance (EAS) tags disposed within the security package so that an alarm will sound within the retail store if a thief attempts to leave the premises without having the store clerk remove or disable the EAS tag. One such prior art security package is disclosed in U.S. Pat. No. 5,460,266 to Mundorf et al. The security package of this reference comprises a main housing member having a centrally located lock compartment which, in conjunction with a separate and complimentary slide plate, is capable of receiving an EAS tag therewithin. In addition to receiving an EAS tag, the lock compartment has a plurality of projections and posts for engagement with complimentary locking levers disposed on the slide plate, as well as a plurality of openings for receiving a customized key to lock and unlock the slide plate.

The security package of the '266 patent, however, presents several drawbacks. First, the dual piece construction of the '266 security package adds complexity and cost in the form of increased tooling and molding requirements over that found in security packages of unibody construction. Moreover, disposing the locking mechanisms within the same compartment as the EAS tag presents the possibility that the EAS tag may interfere with or impede the locking and unlocking operation of the key within the locking compartment. Such physical contact between the EAS tag and the key may also damage or disable the EAS tag, thereby reducing the number of EAS tags which may be recycled for later use which results in increased replacement cost for the retailer. Damage to the EAS tag may also occur due to contact between the EAS tag and the slide plate during the selective positioning of the slide plate in relation to the locking compartment. Yet another drawback stems from this locking arrangement in that the key holes, being formed in the locking compartment, present an opening through which a potential thief may tamper, disable, or possibly remove the EAS tag.

A need therefore exists for a security package of uni-body construction capable of fixedly encompassing an audio-visual article therewithin having an internally disposed EAS cavity for receiving an EAS tag, wherein the EAS cavity is completely sealed and tamper-proof while the security package is in the locked position and wherein the locking mechanism does not interfere or intrude upon the EAS cavity.

SUMMARY OF THE INVENTION

It is accordingly a principal object of the present invention to provide an improved security package for audio cassettes, video cassettes, compact discs, and the like. It is a further object of the present invention to provide a relatively inexpensive lockable security package that can be used in conjunction with retailers' present electronic anti-theft alarm activators.

It is a further object of the present invention to provide a lockable security package of unibody construction having an internally disposed EAS cavity for receiving an EAS tag therein wherein the locking mechanism does not interfere or intrude upon the EAS cavity.

It is yet another object of the invention to provide a security package having an internally disposed EAS cavity which is completely sealed and tamper-proof during the locked position.

In accordance with the present invention, the foregoing objects and advantages are achieved by providing an anti-theft security package comprising a frame member of uni-body construction having a handle member integrally attached to a containment structure. The containment structure includes an article containment area, a surveillance tag containment area, a lock structure disposed between the article containment area and the surveillance tag containment area, and a rotating lid member. The article containment area includes a generally rectangular access aperture for inserting and removing an article into and out of the article containment area. The surveillance tag containment area includes an access aperture for inserting and removing a surveillance tag into and out of the surveillance tag containment area. The lock structure includes first locking means formed therein. The rotating lid member has a surveillance tag enclosing portion hingedly attached to the surveillance tag containment area, and a lock portion extending from the surveillance tag enclosing portion, and an article securing portion extending from the lock portion, wherein the lock portion has second locking means aligned with the first locking means of the lock structure. The hinged rotation of the rotating lid member seals the access aperture of the surveillance tag containment area with the surveillance tag enclosing portion, lockedly engages the first locking means and the second locking means, and secures the article within the article containment area with the article securing portion.

In accordance with another broad aspect of the present invention, a security package of unibody construction is provided for use with an audio-visual article, such as an audio cassette, a video cassette, a compact disc, or the like, comprising a handle member integrally connected to a containment structure. The containment structure includes surveillance tag containment means for receiving a surveillance tag, article containment means for receiving an audio-visual article therein, and lid means hingedly attached to the surveillance tag containment means for enclosing the surveillance tag therewithin and for securing the audio-visual article within the article containment means.

In yet another broad aspect of the present invention, a security package of unibody construction is provided comprising a handle member attached to a containment structure. The containment structure includes a surveillance tag pocket having a single access aperture, an article pocket having a single access aperture and at least one viewing aperture, a lid member hingedly attached to the surveillance tag pocket, and first lock means disposed between the surveillance tag pocket and the article pocket. The lid member has an enclosing portion capable of sealing off the access aperture of the surveillance tag pocket, a securing portion capable of extending partially into the access aperture of the article pocket to secure an article therewithin, and second lock means disposed between the enclosing portion and the securing portion capable of lockingly engaging with the first lock means to maintain the enclosing portion in sealed relation over the access aperture of the surveillance tag pocket and to maintain the securing portion in position within the access aperture of the article pocket to secure the article therewithin.

The foregoing features and advantages of the present invention will be readily apparent to those skilled in the art from a review of the following detailed description of the preferred embodiment in conjunction with the accompanying drawings and claims.

DETAILED DESCRIPTION OF THE PREFERRED EMBODIMENT

Figure 1:
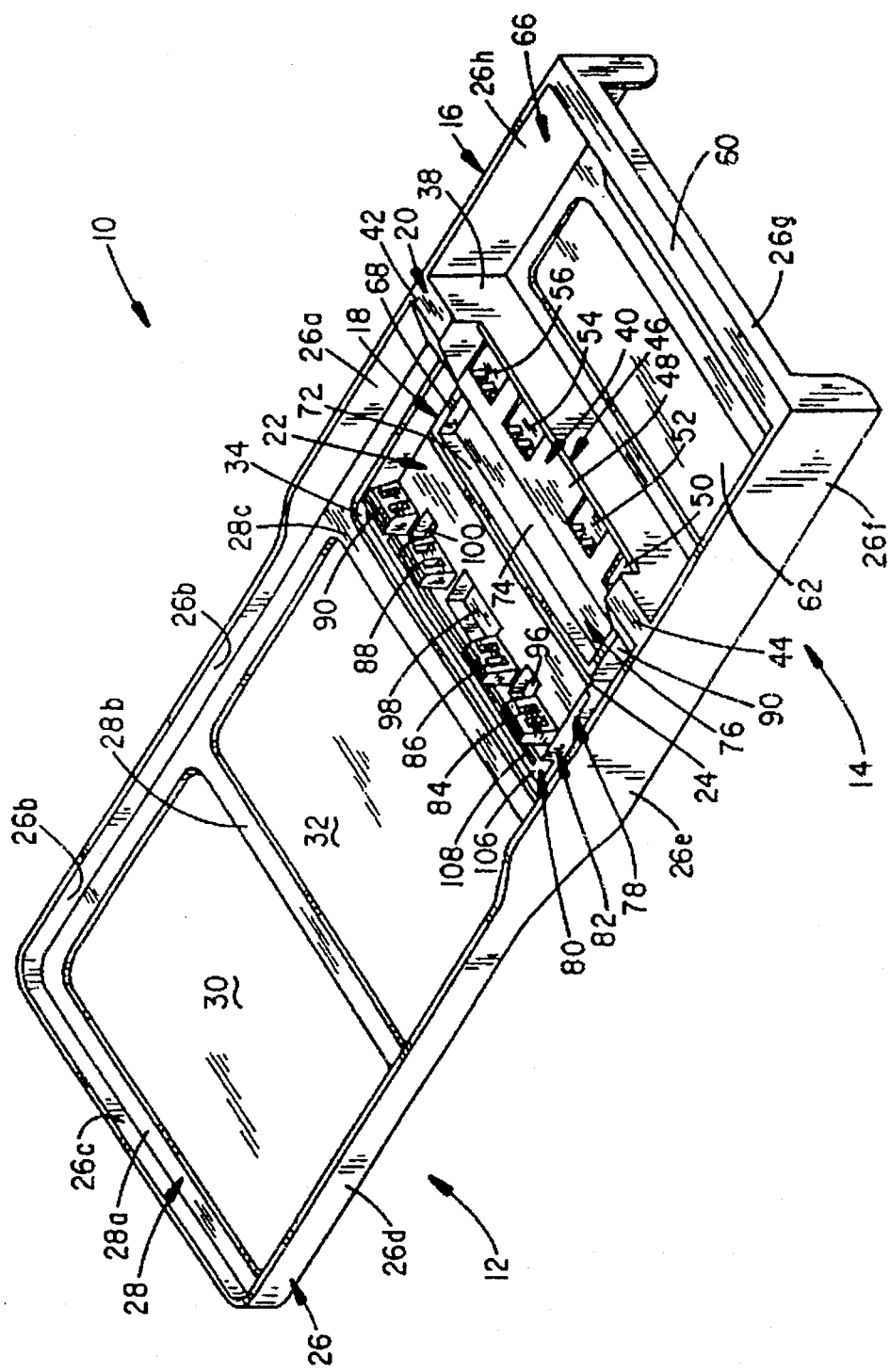
FIG. 1 is a perspective view of a security package 10 in accordance with a preferred embodiment of the present invention.

Referring initially to FIG. 1, shown in perspective is a preferred embodiment of the present invention comprising a security package 10 of unibody construction having a generally rectangular handle member 12 integrally connected to a containment structure 14. Containment structure 14 includes an article containment pocket 16, an electronic article surveillance (EAS) tag containment pocket 18, a lock structure 20 disposed between article containment pocket 16 and EAS tag containment pocket 18, and a rotating lid member 22 hingedly attached to EAS tag containment pocket 18 via a flexible hinge member 24. A vertically oriented rim member 26 forms the outer periphery of security package 10 and includes first handle portion 26a, second handle portion 26b, third handle portion 26c, fourth handle portion 26d, fifth handle portion 26e, first side wall portion 26f, end wall portion 26g, and second side wall portion 26h. As can be readily seen, second, third, and fourth handle portions 26b–26d are shorter in height than first and fifth handle portions 26a, 26e, while first and fifth handle portions 26a, 26e are equal in height to first side wall portion 26f, end wall portion 26g, and second side wall portion 26h. First and second side wall portions 26f, 26h extend rearwardly from the junction where first and fifth handle members 26a, 26e meet lock structure 20 toward end wall 26g. Handle member 12 comprises first handle portion 26a, second handle portion 26b, third handle portion 26c, fourth handle portion 26d, fifth handle portion 26e, and a horizontally disposed support member 28. Support member 28 includes a first support portion 28a, a second support portion 28b, and a third support portion 28c. First support portion 28a is integrally attached to the inner periphery of handle portions 26a–26e at the verticle midlines thereof so as to extend in a generally perpendicular fashion therefrom. Second support portion 28b extends perpendicularly between second handle portion 26b and fourth handle portion 26d at the longitudinal midlines thereof. Third support portion 28c is disposed parallel to second support portion 28b and extends across first support portion 28a at the approximate point where first and fifth handle portions 26a, 26e meet second and fourth handle portions 26b, 26d, respectively. First, second, and third apertures 30, 32, 34 are formed within support member 28 to facilitate the gripping of handle member 12 and for bolstering the structural integrity of handle member 12.

Figure 2:
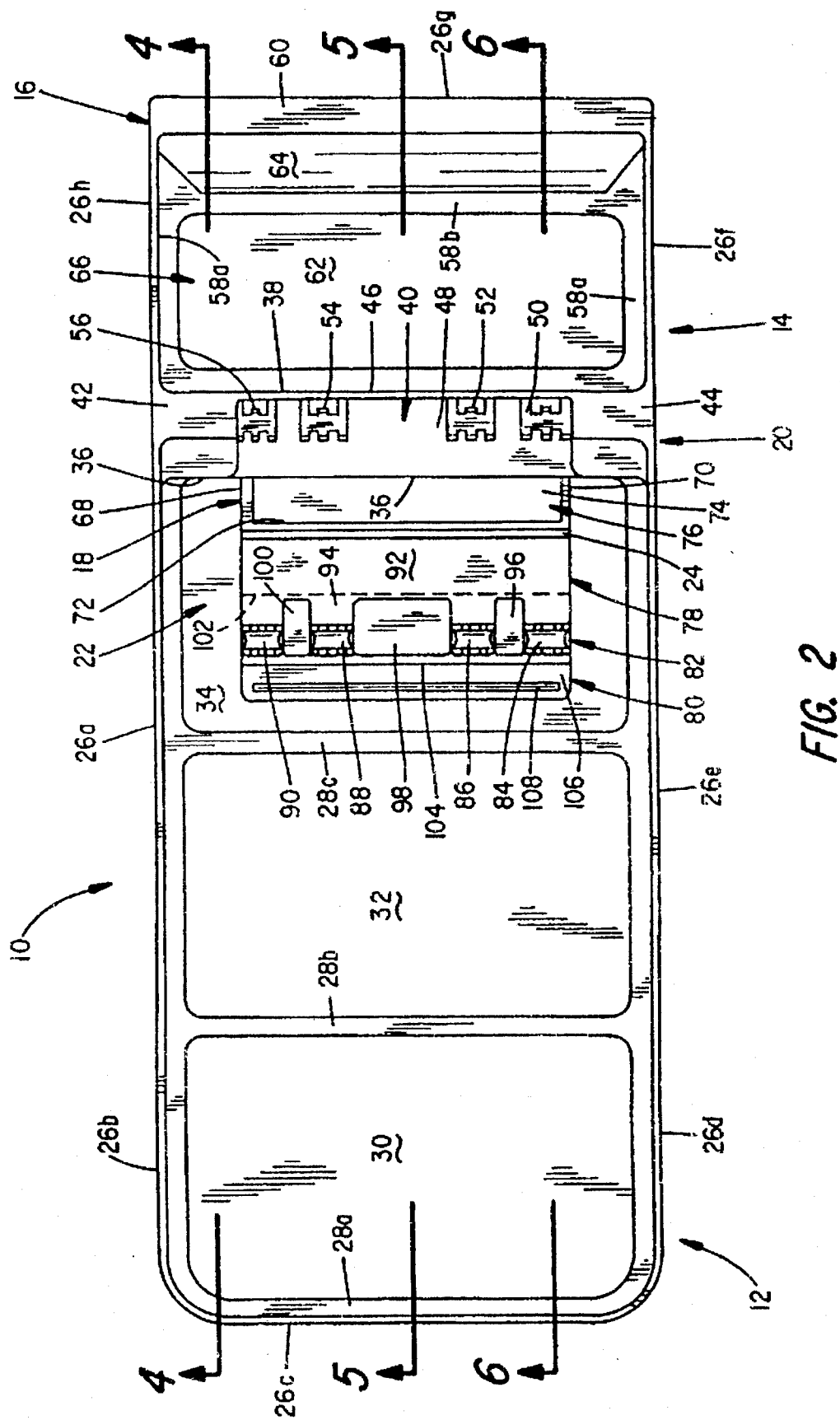
FIG. 2 is a top plan view of the security package 10 shown in FIG. 1.

With combined reference to FIGS. 1 and 2, lock structure 20 is disposed in a generally perpendicular fashion between first and second side wall portions 26f, 26h. Lock structure 20 comprises a generally rectangular engagement structure 40 disposed between first and second beveled structures 42, 44. Engagement structure 40 is aligned with and integrally connected to first and second beveled structures 42, 44 such that a vertical front wall 36 is defined extending perpendicularly between first and second side wall portions 26f, 26h at the approximate junction where support portion 28a abuts first and second beveled structures 42, 44. Engagement structure 40 has a horizontal engagement portion 48 extending perpendicularly rearward from front wall 36 toward a vertically extending lip member 46. Lip member 46, in accordance with the integral and aligned relationship between engagement structure 40 and first and second beveled structures 42, 44, forms part of a vertical rear wall 38 of lock structure 20 extending perpendicularly between first and second side wall portions 26f, 26h. Rear wall 38 is generally parallel to front wall 36 and serves as one of the side walls of article containment pocket 16. In terms of height, front wall 36 is shorter than rear wall 38. In specific, front wall 36 extends between the lower edges of first and second side wall portions 26f, 26h and the vertical midline of first and second side wall portions 26f, 26h. Rear wall 38 extends upwardly from the lower edges of first and second side wall portions 26f, 26h toward the upper edge of lip member 46, the upper edge of first side wall portion 26f, and the upper edge of second side wall portion 26h. Engagement portion 48 extends between rear surface 38 and from surface 36 of lock structure 20 and contains first, second, third, and fourth engagement apertures 50, 52, 54, 56 which will be described in greater detail below.

Article containment pocket 16 includes rear wall 38 of lock structure 20, the aft segments of first and second side wall portions 26f, 26h extending perpendicularly and rearwardly away from rear wall 38, a lower retaining member 58, end wall portion 26g, and an upper retaining member 60. Lower retaining member 58 includes a first lower retaining portion 58a integrally disposed along the bottom edges of rear wall 38, first side wall portion 26f, and second side wall portion 26h, and a second lower retaining portion 58b extending perpendicularly between first and second side wall portions 26f, 26h. End wall portion 26g has opposing lateral edges connected to first and second side wall portions 26f, 26h, an upper edge connected to upper retaining member 60, and a partially recessed lower edge. Upper retaining member 60 extends perpendicularly between first and second side wall portions 26f, 26h and perpendicularly away from the upper edge of end wall portion 26g. A single access aperture 66 for receiving and removing audio-visual articles into and from article containment pocket 16 is defined between the upper edges of first and second side wall portions 26f, 26h, the upper edge of rear wall 38, and inwardly facing edge of upper restraining member 60.

By way of illustration and not limitation, article containment pocket 18 is dimensioned to house an audio cassette. However, it is to be readily understood that article containment pocket 18 may be likewise dimensioned to accommodate any variety of generally rectangular audio-visual articles, such as video cassettes, compact disc "jewel boxes", etc . . . First and second viewing apertures 62, 64 are formed within lower retaining member 58 to facilitate consumer viewing and inspection of an encompassed audio-visual article. First viewing aperture 62 is generally rectangular in shape and coplanar with lower retaining member 58. Second viewing aperture 64 extends rearwardly from second lower retaining portion 58b toward the bottom edge of end wall portion 26g. Due to the partially recessed construction of end wall portion 26g, second viewing aperture is partially coplanar with lower retaining member 58 and partially coplanar with end wall portion 26g. Thus, an enclosed audio-visual article may be viewed along the bottom and end portions thereof via first and second viewing apertures 62, 64.

In the embodiment shown, EAS tag containment pocket 18 is a generally box like structure comprising a first side wall 68, a second side wall 70, a end wall 72, a bottom member 74, and front surface 36 of lock structure 20. First and second side walls 68, 70 extend perpendicularly from front surface 36 of lock structure 20, each having a first end attached to front surface 36 and a second end attached to end wall 72. End wall 72 extends perpendicularly between first and second side walls 68, 70 opposite from and parallel with front surface 36 of lock structure 20. Bottom member 74 extends between the lower edges of first side wall 68, second side wall 70, end wall 72, and front surface 36 of lock structure 20. This box like construction provides a single access aperture 76 opposite bottom member 74 for receiving and removing an EAS tag into and from EAS tag containment pocket 18. In particular, access aperture 76 of EAS tag containment pocket 18 is defined along the plane extending between the upper edges of first side wall 68, second side wall 70, end wall 72, and front surface 36 of lock structure 20. Dimensioned as such, EAS tag containment pocket 18 provides a generally rectangular box like structure suitable for housing EAS tags of varying shapes and sizes therewithin. It is to be noted, however, that EAS tag containment pocket 18 may be dimensioned to form any number of different geometric shapes aside from the generally rectangular shape of the illustrated embodiment.

Lid member 22 includes an enclosing portion 78, a securing portion 80, and a lock portion 82 disposed therebetween. Enclosing portion 78 is a generally planar sheet member 92 of rectangular shape and uniform thickness having a first end hingedly attached to end wall 72 of EAS tag containment pocket 18 via hinge member 24 and a second end integrally connected to lock portion 82. Lock portion 82 includes a generally planar segmented surface 94 having first, second, third, and fourth engagement members 84, 86, 88, 90 protruding perpendicularly therefrom. Segmented surface 94 is generally coplanar with sheet member 92 of enclosing portion 78 and the junction therebetween is delineated for clarity with dashed lines at 102 in FIG. 2. Lock portion 82 also includes a first beveled portion 96 formed between first and second engagement members 84, 86, a second beveled portion 98 formed between second and third engagement members 86, 88, a third beveled portion 100 formed between third and fourth engagement members 88, 90, and an end wall 104 extending perpendicularly between segmented surface 94 and securing portion 80. End wall 104 is disposed opposite from and parallel to junction 102 and has an upper edge connected to segmented surface 94 and a lower edge connected to securing portion 80. Securing portion 80 comprises a generally planar sheet member 106 of uniform thickness extending perpendicularly from the lower edge of end wall 104 having an elevated rail member 108 disposed thereon.

Figure 3:
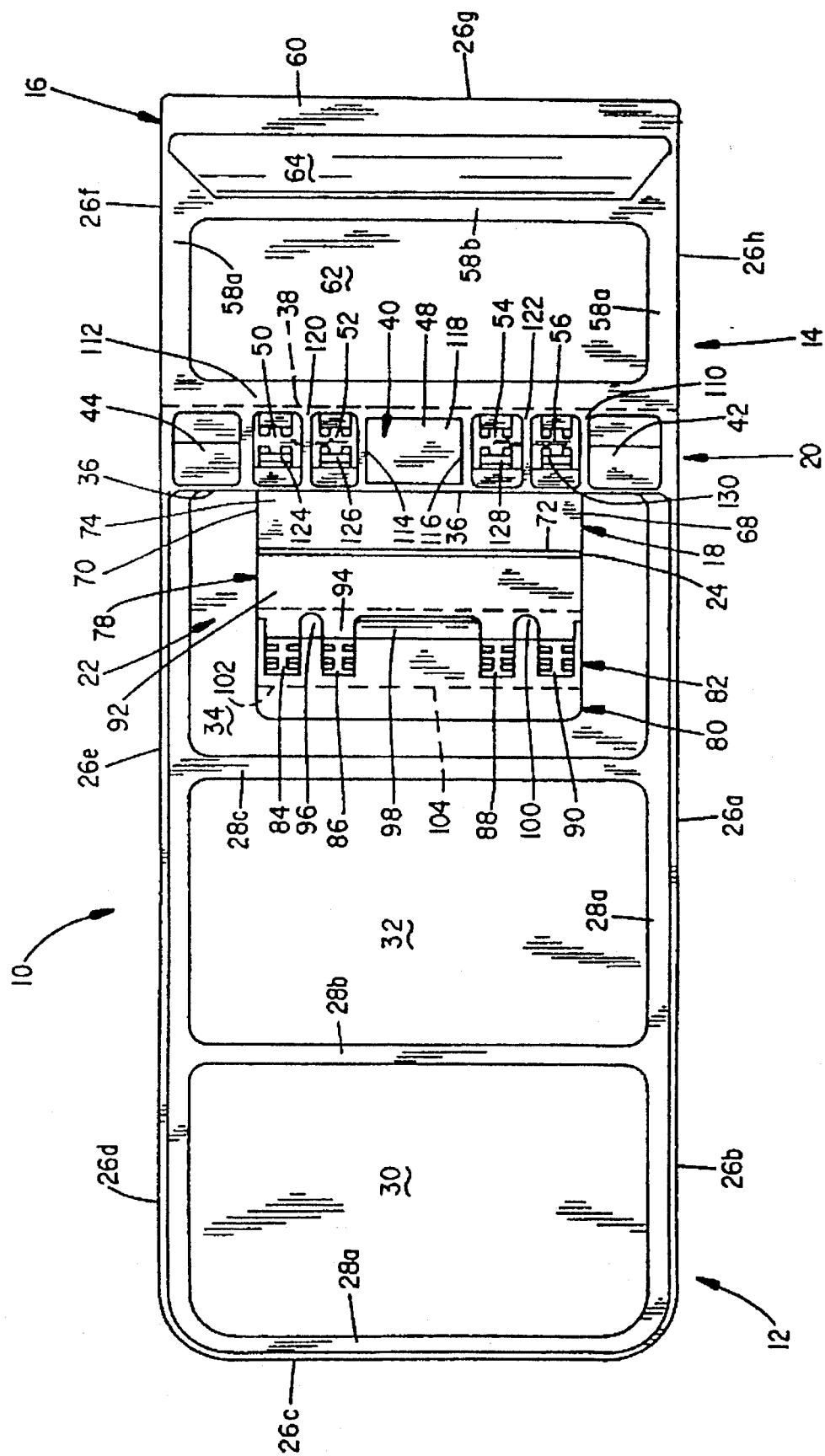
FIG. 3 is a bottom plan view of the security package 10 shown in FIG. 1.

Referring now to FIG. 3, shown is a bottom plan view of security package 10 further detailing the unibody construction in accordance with the present invention, and particularly that of containment structure 14. Here it can be seen that lock structure 20 is basically open faced and hollow as viewed from the underside of security package 10. A first dividing wall 110 is provided extending perpendicularly between front wall 36 and rear wall 38. First dividing wall 110 forms a junction between first beveled structure 42 and fourth engagement aperture 56 of engagement structure 40. A second dividing wall 112 is provided in similar fashion disposed parallel to first dividing wall 110 to form a junction between second beveled structure 44 and first engagement aperture 50 of engagement structure 40. First and second dividing walls 110, 112 extend vertically between the lower edges of front wall 36 the upper surfaces of first and second beveled structures 42, 44, respectively. A third dividing wall 114 and a fourth dividing wall 116 are further provided extending perpendicularly between front wall 36 and rear wall 38 in parallel spaced relation to define a center recess portion 118 within engagement structure 40. Third and fourth dividing walls 114, 116 extend vertically between the lower edges of front and back walls 36, 38 and engagement portion 48. A fifth dividing wall 120 and a sixth dividing wall 122 are disposed in generally the same manner as third and fourth dividing walls 114, 116 but do not extend the entire vertical length between engagement portion 48 and the lower edges of front and rear walls 36, 38. Instead, fifth and sixth dividing walls 120, 122 extend perpendicularly downward from engagement portion 48 a partial distance toward the lower edges of front and rear walls 36, 38. A first strut member 124 is provided extending perpendicularly between second and fifth dividing walls 112, 120. A second strut member 126 is provided extending perpendicularly between fifth and third dividing walls 120, 114. A third strut member 128 is provided in similar fashion between fourth and sixth dividing walls 116, 122. A fourth strut member 130 extends in the same manner between sixth and first dividing walls 122, 110. Strut members 124–130 are substantially shorter in height than dividing walls 110–116, 120,122 and abut a plurality of angled teeth members disposed within engagement apertures 50, 52, 54, 56.

FIG. 3 also provides further detail as to the construction of lid member 22 in accordance with the present invention. As noted above, lid member 22 comprises enclosing portion 78, lock portion 80, and securing portion 82. Enclosing portion 78 includes generally planar sheet member 92 which is hingedly attached to end wall 72 of EAS tag containment pocket 18 via hinge member 24. Sheet member 92 is generally coplanar with segmented surface 94 of lock portion 82. Once again, the junction between sheet member 92 and segmented surface 94 is represented by dashed lines at reference to numeral 102. First, second, third, and fourth engagement members 84, 86, 88, 90 are disposed within lock portion 82 and separated by first, second, and third beveled portions 96, 98, 100, respectively. To be specific, first, second, third and fourth engagement members 84, 86, 88, 90 protrude in a generally perpendicular fashion away from segmented surface 94 of lock portion 82 and, as mentioned above, are interspaced so as to be generally aligned with first, second, third and fourth engagement apertures 50, 52, 54, 56. End wall 104 is shown in dashed lines and forms the junction between lock portion 82 and securing portion 80. Also apparent is the manner in which lower retaining member 58 extends along the bottom of article containment pocket 16 from rear wall 38 of lock structure 20 toward end wall portion 26g.

With regard to EAS tag containment pocket 18, FIG. 3 illustrates the perpendicular relationship between front wall 36 of lock structure 20 and bottom member 74 of EAS tag containment pocket 18. As mentioned above, bottom member 74 extends laterally between the lower edges of first and second side walls 68, 70 and longitudinally between the lower edges of front wall 36 and end wall 72. Hinge member 24 is flexibly interconnected between the upper edge of end wall 72 and enclosing portion 74 of lid member 22. Through this hinged arrangement, lid member 22 is capable of being rotated about the upper edge of end wall 72 such that first, second, third and fourth engagement members 84, 86, 88, 90 lockingly engage within first, second, third and fourth engagement apertures 50, 52, 54, 56, respectively. This locking arrangement positions enclosing portion 78 of lid member 22 directly over access aperture 76 (FIGS. 1 and 2) of EAS tag containment pocket 18 so as to completely seal and enclose an EAS tag therewithin. As will be explained in greater detail below, this locking arrangement also causes securing portion 80 to extend partially into access aperture 66 (FIGS. 1 and 2) of article containment pocket 16 so as to secure an audio-visual article therewithin.

Figure 4:
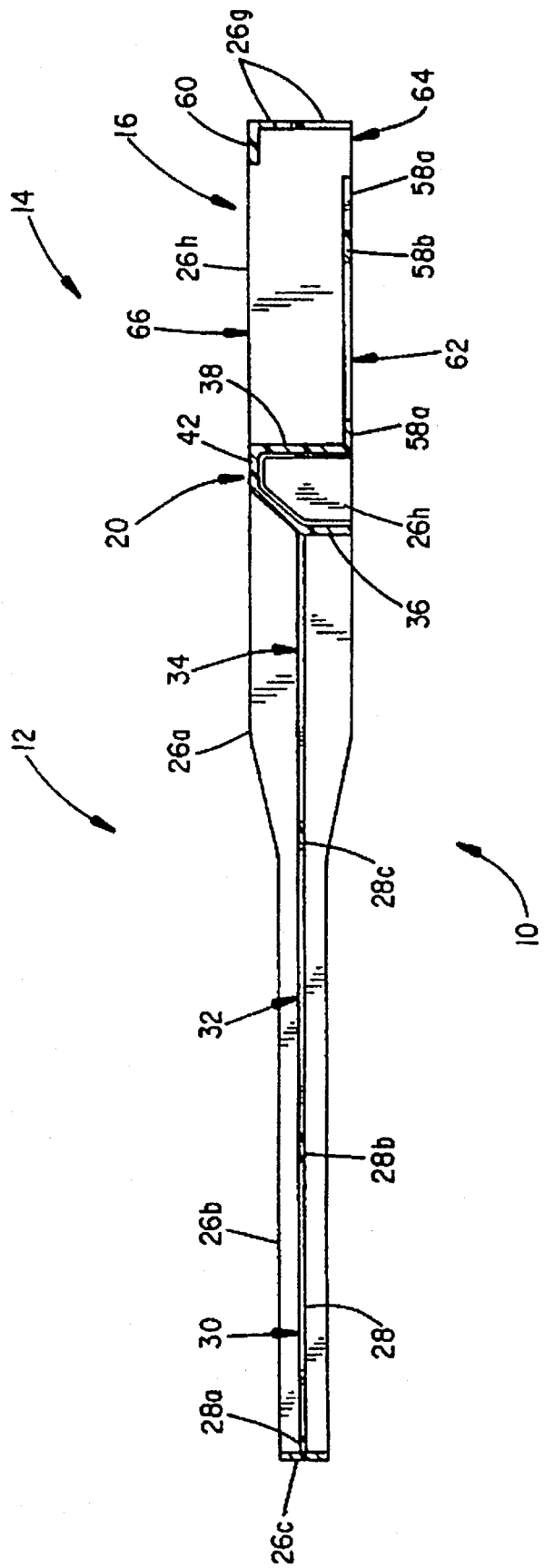
FIG. 4 is a cross-sectional view of the security package 10 taken along line 4—4 of FIG. 2.

Referring now to FIG. 4, shown is a cross sectional view of security package 10 taken along lines 4—4 in FIG. 2. Once again, internal support member 28 is disposed at approximately the vertical midlines of first, second, and third handle portions 26a, 26b, 26c. Front wall 36 of lock structure 20 extends in a substantially vertical fashion between the approximate junction between support member 28 and first beveled structure 42 and the lower edge of second side wall portion 26h. In other words, front wall 36 is approximately half the height of second side wall portion 26h and disposed perpendicular to first support portion 28a. The hollow nature of first beveled structure 42 is also readily apparent and it is to be noted that, by definition, second side wall portion 26h forms the outer wall of first beveled structure 42 in addition to extending rearwardly from rear wall 38 for connection to lower retaining member 58, end wall portion 26g, and upper retaining member 60. Also to be noted is the coplanar relationship between first viewing aperture 62 and lower retaining member 58 and the extension of second viewing aperture 64 from the rearward edge of second lower retaining portion 58b to the lower edge of end wall portion 26g. Along lines 4—4 in FIG. 2, access aperture 66 of article containment pocket 16 extends along the plane defined by the upper edge of rear surface 38 of lock structure 20, the forward edge of upper retaining member 60, and the segment of second side wall 26h that extends between rear wall 38 and the forward edge of upper retaining member 60.

Figure 5:
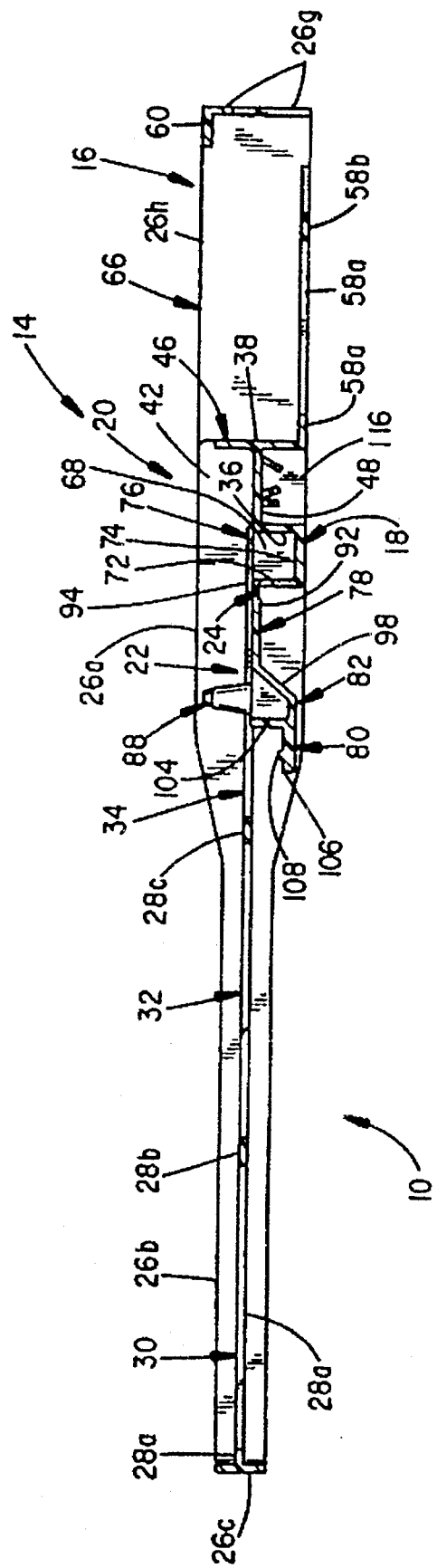
FIG. 5 is a cross-sectional view of the security package 10 taken along line 5—5 of FIG. 2.

FIG. 5 illustrates a cross sectional view of security package 10 taken along lines 5—5 in FIG. 2 further detailing the construction of containment structure 14 in accordance with the present invention. In that line 5—5 longitudinally bisects security package 10, rear wall 38 of lock structure 20 extends between the lower edge of second side wall portion 26h and the upper edge of lip member 46. Engagement portion 48 of lock structure 20 extends perpendicularly from the lower edge of lip member 46 for connection to front wall 36. As described above, front wall 36 is disposed perpendicular with regard to engagement portion 48 and extends vertically between the lower edge of second side wall portion 26h and the approximate junction where internal support member 28 abuts first beveled structure 42. This cross sectional view also illustrates fourth dividing wall 116 as it extends perpendicularly between front wall 36 and rear wall 38 within engagement structure 40 (not shown) of lock structure 20. A plurality of angled teeth members indicated generally by reference numeral 132 are disposed within third engagement aperture 54 and will be described in greater detail below with regard to FIGS.7–11. EAS tag containment pocket 18 includes front wall 36 of lock structure 20, end wall 72, bottom member 74 extending perpendicularly therebetween, and first side wall 68. Enclosing portion 78 of lid member 22 is attached to end wall 72 of EAS tag containment pocket 18 via flexible hinge member 24 which extends therebetween. Lock portion 82 is integrally connected to sheet member 92 of enclosing portion 78 and includes second beveled portion 98 and third engagement member 88. Lock portion 82 is constructed such that one end is coplanar with sheet member 92 of enclosing portion 78 and the other end is coplanar with sheet 106 of securing portion 80. Third engagement member 88 protrudes perpendicularly from segmented surface member 94 and is disposed in vertically aligned relation with regard to second beveled portion 98.

Figure 6:
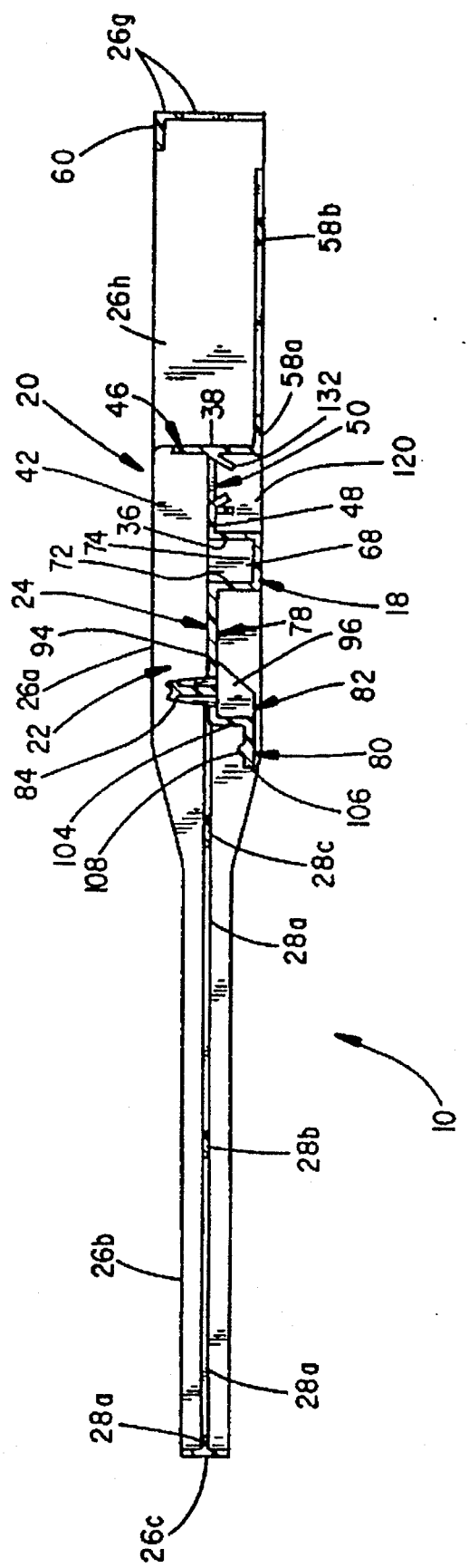
FIG. 6 is a cross-sectional view of the security package 10 taken along line 6—6 of FIG. 2.

Referring now to FIG. 6, shown is a cross sectional view of security package 10 of the present invention taken along lines 6—6 in FIG. 2. As with the view in FIG. 5, rear wall 38 extends between the lower edge of second side wall portion 26h and the upper edge of lip member 46. Engagement portion 48 extends perpendicularly from the lower edge of lip member 46 toward front wall 36 and has first engagement aperture 50 formed therein. Angled teeth members, shown generally at 132, are disposed within first engagement aperture 50 and extend in a generally downward fashion toward the lower edge of second side wall portion 26h. Once again, lid member 22 comprises enclosing portion 78 integrally and hingedly connected to the upper edge of end wall 72 via hinge member 24, lock portion 82 having a first end integrally connected to enclosing portion 78 and a second end connected to securing portion 80. First beveled portion 96 is also shown extending in a ramped fashion between segmented surface 94 and the lower edge of end wall 104. First engagement member 84 extends perpendicularly from segmented surface 94.

Figure 7:
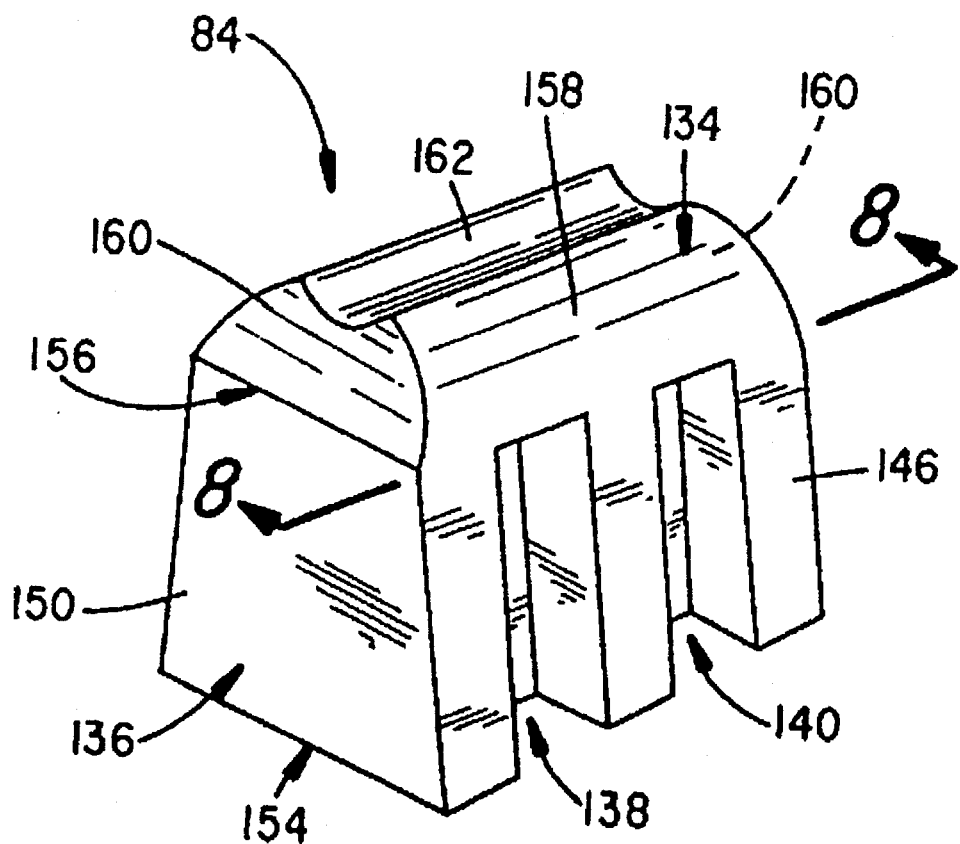
FIG. 7 is a perspective view of an engagement member of the present invention.
Figure 8:
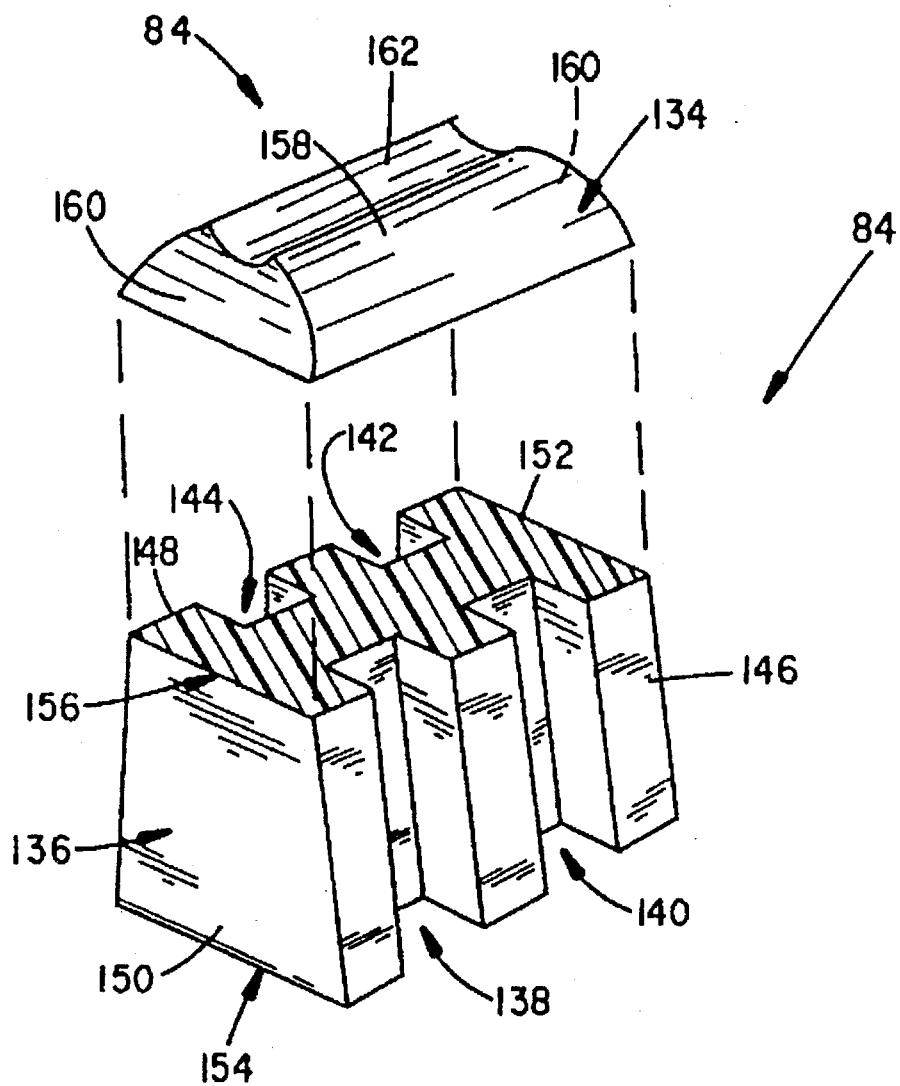
FIG. 8 is an exploded view of the engagement member shown in FIG. 7 taken along line 8—8.

The detailed construction of first, second, third, and fourth engagement members 84, 86, 88, 90 will now be described with reference to first engagement member 84 shown in FIGS. 7 and 8. First engagement member 84 includes a generally rectangular base portion 136 integrally attached to a cap portion 134. Base portion 136 is provided having first and second longitudinal walls 146, 148, first and second lateral end walls 150, 152, a lower surface 154, and an upper surface 156. As shown in FIG. 8, upper surface 156 extends parallel to lower surface 154 and is generally perpendicular to first and second lateral end walls 150, 152. First, second, third, and fourth engagement channels 138, 140, 142, 144 are formed within base portion 136 and extend in a generally vertical fashion between lower surface 154 and upper surface 156. More specifically, first and second engagement channels 138, 140 are formed within a first side 146 of base portion 136, while third and fourth engagement channels 142, 144 are formed within a second side 148 of base portion 136 opposite first side 146. Cap portion 134 is provided having a notch area 162, a pair of beveled side portions 160, and a partially rounded upper surface 158. Notch area 162 is formed along the longitudinal axis of cap member 134. Partially rounded upper surface 158 extends laterally outwardly from the longitudinal sides of notch area 162 toward the junction where cap portion 134 meets base portion 136. Although not illustrated in FIGS. 7 and 8, it is to be understood that second, third, and fourth engagement members 86, 88, 90 are identical in construction to first engagement member 84.

Figure 9:
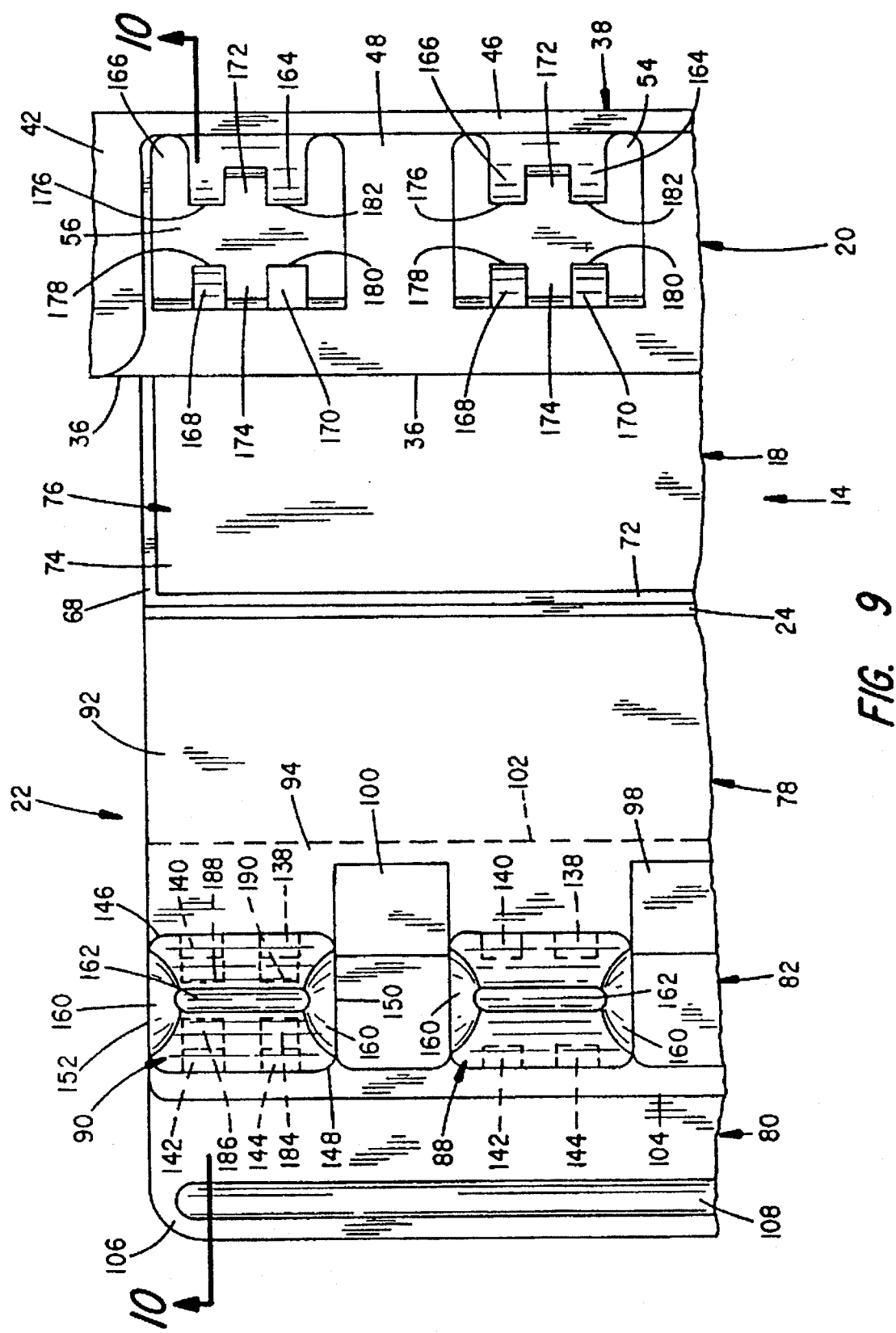
FIG. 9 is an enlarged top plan view of lid member 22, EAS tag containment pocket 18, and lock structure 20 of the present invention.

Referring now to FIG. 9, shown is an enlarged partial view of EAS tag containment pocket 18, lock structure 20, and lid member 22. Of particular interest is the construction of third and fourth engagement apertures 54, 56. Third and fourth engagement apertures 54, 56 are formed within engagement portion 46 of lock structure 20 and include a first angled tine member 164, a second angled tine member 166, a third angled tine member 168, and a fourth angled tine member 170. A first recess channel 172 and a second recess channel 174 are formed between first and second angled tine members 164, 166 and third and fourth angled line members 168, 170, respectively. First angled tine member 164 has a generally planar engagement surface 182 disposed at the terminal end thereof for mating with a beveled surface 184 within fourth engagement channel 144. Second angled tine member 166 includes a generally planar engagement surface 176 disposed at the terminal end thereof for mating with a beveled surface 186 within third engagement channel 142. Third angled tine member 168 is configured in a similar fashion with a generally planar engagement surface 178 disposed at the terminal end of third angled tine member 164 for mating engagement with a beveled surface 188 within engagement channel 140. Finally, fourth angled tine member 170 includes a generally planar engagement surface 180 for mating with a beveled surface 190 within first engagement channel 138. It must once again be noted that, although FIG. 9 is restricted to third and fourth engagement apertures 54, 56, the aforementioned description applies equally to first and second engagement apertures 50, 52 in that engagement apertures 50–56 are identical in construction.

Figure 10:
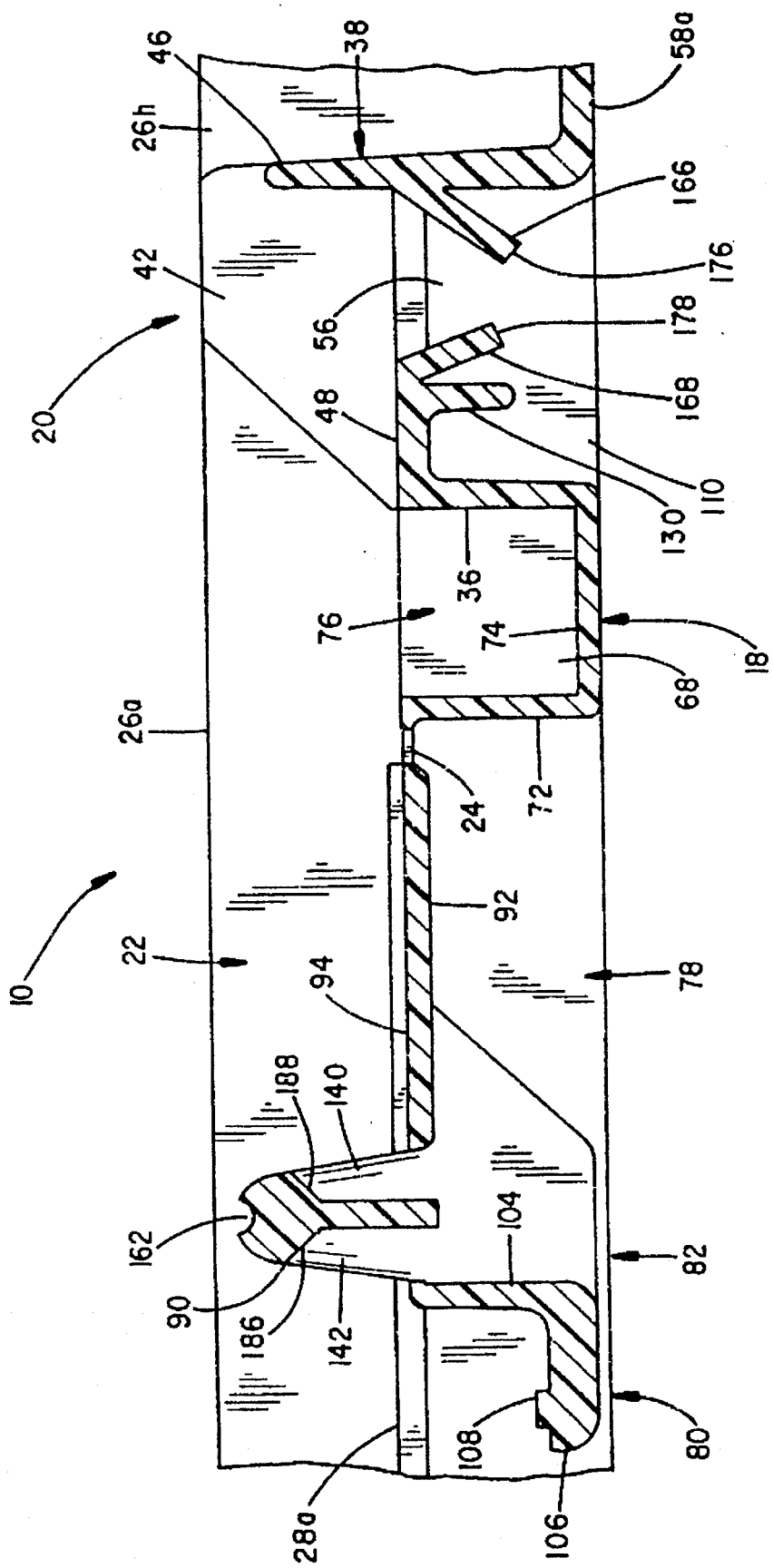
FIG. 10 is an enlarged cross-sectional view of lid member 22, EAS tag containment pocket 18, and lock structure 20 taken along line 10—10 of FIG. 9.

Referring now to FIG. 10, shown is an enlarged cross sectional view of security package 10 of the present invention taken along lines 10—10 in FIG. 9. In this cross sectional view, fourth engagement aperture 56 is longitudinally bisected along the plane extending through second and third angled tine members 166, 168. Second and third angled tine members 166, 168 extend downwardly and inwardly away from fourth engagement aperture 56. Generally planar engagement surfaces 176, 178 are disposed on the terminal ends of second and third angled tine members 166, 168, respectively. First dividing wall 110 extends perpendicularly between rear wall 38 and front wall 36. Rear wall 38 extends between the lower edge of second side wall portion 26h and the upper edge of lip member 46. Engagement portion 48 extends perpendicularly from rear wall 38 until a junction with front wall 36 of lock structure 20. Also disposed within lock structure 20 is fourth strut member 130 which is disposed proximate third angled tine member 168 and which extends perpendicularly between first dividing wall 110 and sixth dividing wall 122 (not shown). As shown, EAS tag containment pocket 18 extends perpendicularly outward from front wall 36 of lock structure 20. First side wall 68 and bottom member 74 extend between front wall 36 and end wall 72 so that EAS tag containment pocket 18 is capable of receiving any variety of EAS tags through access aperture 76. Hinge member 24 flexibly interconnects end wall 72 of EAS tag containment pocket 18 and lid member 22. Lid member 22 is comprised of an enclosing portion 78 disposed between hinge member 24 and lock portion 82. Lock portion 82 has a segmented surface member 94 connected to and generally coplanar with sheet member 92 of enclosing portion, a vertically disposed end wall 104 extending between segmented surface member 94 and securing portion 106, and fourth engagement member 90 protruding in a generally perpendicular fashion from segmented surface member 94. Fourth engagement member 90 includes second engagement channel 140 with beveled surface 188, third engagement channel 142 with beveled surface 186, and longitudinal notch area 162.

Figure 11:
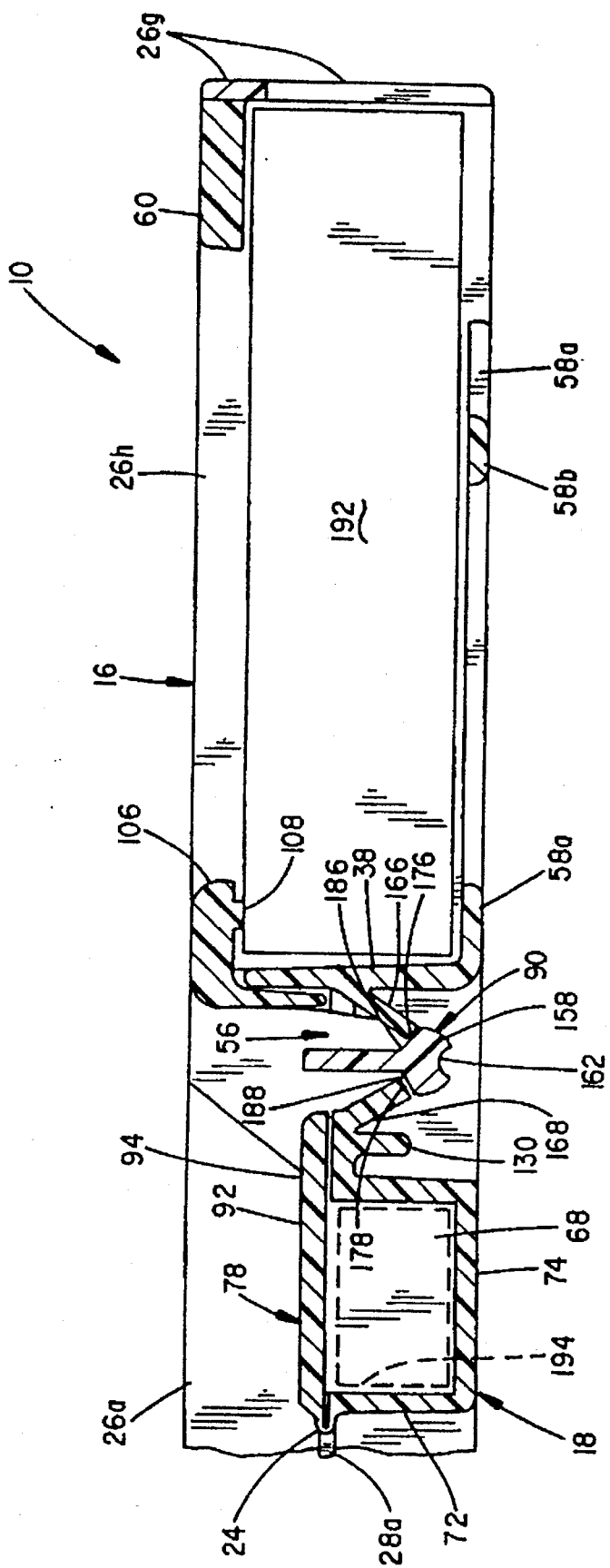
FIG. 11 is an enlarged cross-sectional view illustrating the mode of operation of the locking assembly of the present invention.

Turning finally to FIG. 11, shown is security package 10 of the present invention while in a locked condition with an audio-visual article 192 disposed within article containment pocket 16 and an EAS tag 194 (shown in phantom) disposed within EAS tag containment pocket 18. To achieve this locked condition, a user may simply rotate lid member 22 about hinge member 24 until fourth engagement member 90 is lockingly engaged within fourth engagement aperture 56. Engagement surface 178 of third angled tine member 168 is situated in abutting relationship with beveled surface 188 of fourth engagement member 90. In similar fashion, engagement surface 176 of second angled tine member 166 is disposed so as to abut beveled surface 186 of fourth engagement member 90. Through this arrangement, engagement members 84–90 lockingly engage with engagement apertures 50–56 such that a potential thief is unable to open or disarm security package 10 while in the locked condition. Moreover, the swinging rotation of lid member 22 positions enclosing portion 78 squarely over access aperture 76 of EAS tag containment pocket 18 to completely enclose and seal EAS tag 194 therewithin. As such, a potential thief is unable to access EAS tag 194 and therefore cannot tamper or damage EAS tag 194 in an effort to circumvent the electronic surveillance systems employed within the particular retail store.

In light of the foregoing, the present invention solves the various drawbacks found in the prior art security packages by providing a security package 10 of uni-body construction capable of fixedly encompassing an audio-visual article therewithin having an internally disposed EAS tag containment pocket 18 for receiving an EAS tag 194. The unibody construction of the present invention reduces complexity and cost in the form of decreased tooling and molding requirements. Moreover, the locking mechanism of the present invention is separate and distinct from the EAS tag containment pocket 18 such that EAS tag 194 will in no way hinder or impede the locking mechanism from engaging or disengaging. The present invention also minimizes the amount to which an EAS tag is subjected to damaging or disabling physical contact, which increases the degree to which EAS tags may be recycled for continued use. The locking arrangement of the present invention is also advantageous in that the EAS tag containment pocket 18 completely encloses the EAS tag, with absolutely no open apertures, so as to thwart a would-be thief from removing, damaging, or disabling the enclosed EAS tag.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An anti-theft security package comprising:

a frame member of unibody construction having a handle member integrally attached to a containment structure, said containment structure including an article containment area, a surveillance tag containment area, a lock structure disposed between said article containment area and said surveillance tag containment area, and a rotating lid member;

said article containment area including a generally rectangular access aperture for inserting and removing an article into and out of said article containment area;

said surveillance tag containment area including an access aperture for inserting and removing a surveillance tag into and out of said surveillance tag containment area;

said lock structure including first locking means formed therein;

said rotating lid member having a surveillance tag enclosing portion hingedly attached to said surveillance tag containment area, a lock portion extending from said surveillance tag enclosing portion, and an article securing portion extending from said lock portion, said lock portion having second locking means aligned with said first locking means of said lock structure;

whereby the hinged rotation of said rotating lid member seals said access aperture of said surveillance tag containment area with said surveillance tag enclosing portion, lockedly engages said first locking means and said second locking means, and secures said article within said article containment area with said article securing portion.

2. The anti-theft security package as set forth in claim 1 and further, said surveillance tag containment area including a pocket structure attached to said lock structure, wherein said access aperture of said surveillance tag containment area is formed along an upper plane of said pocket structure and said surveillance tag enclosing portion of said rotating lid member is hingedly attached to an upper portion of said pocket structure.

3. The anti-theft security package as set forth in claim 2 and further, wherein said article containment area includes at least one viewing aperture disposed opposite said access aperture of said article containment area.

4. The anti-theft security package set forth in claim 3 and further, wherein said first locking means comprises at least one engagement aperture having opposing angled teeth and said second locking means comprises at least one engagement member having opposing beveled surfaces for mating with said angled teeth.

5. The anti-theft security package as set forth in claim 4 and further, said pocket structure including first and second side walls extending from said lock structure, an end wall extending between said first and second side walls, and a bottom member extending between said first and second side walls, said end wall, and said lock area opposite from said access aperture of said surveillance tag containment area, wherein said surveillance tag enclosing portion of said rotating lid member is hingedly attached to said end wall.

6. A security package of unibody construction for use with an audio-visual article, such as an audio cassette, a video cassette, a compact disc, and the like, comprising:

a handle member integrally connected to a containment structure;

said containment structure including surveillance tag containment means for receiving a surveillance tag, article containment means for receiving an audio-visual article therein, and lid means hingedly attached to said surveillance tag containment means for enclosing said surveillance tag therewithin and for securing said audio-visual article within said article containment means.

7. The security package as set forth in claim 6 and further, comprising first locking means disposed between said surveillance tag containment means and said article containment means, said lid means including second locking means for engagedly locking with said first locking means to lock said surveillance tag within said surveillance tag containment means and to lock said audio-visual article within said article containment means.

8. The security package as set forth in claim 7 and further, wherein said surveillance tag containment means comprises a generally rectangular box having a single access aperture, and said article containment means comprises a generally rectangular box having a single access aperture and at least one viewing aperture.

9. The security package as set forth in claim 8 and further, wherein said lid means comprises a generally planar enclosing portion for sealing said access aperture of said surveillance tag containment means, a generally planar securing portion capable of extending partially into said access aperture of said article containment means to secure said audio-visual article therewithin, said second locking means being disposed between said enclosing portion and said securing portion.

10. The security package as set forth in claim 9 and further, wherein said first locking means comprises at least one engagement aperture and said second locking means comprises at least one engagement member.

11. The security package as set forth in claim 10 and further, wherein said at least one engagement aperture includes opposing angled teeth members and said at least one engagement member includes opposing beveled surfaces for mating with a top surface of said angled teeth members.

12. A security package of unibody construction comprising:

a handle member attached to a containment structure;

said containment structure including a surveillance tag pocket having a single access aperture, an article pocket having a single access aperture and at least one viewing aperture, a lid member hingedly attached to said surveillance tag pocket, and first lock means disposed between said surveillance tag pocket and said article pocket; and said lid member having an enclosing portion capable of sealing off said access aperture of said surveillance tag pocket, a securing portion capable of extending partially into said access aperture of said article pocket to secure an article therewithin, and second lock means disposed between said enclosing portion and said securing portion capable of lockingly engaging with said first lock means to maintain said enclosing portion in sealed relation over said access aperture of said surveillance tag pocket and to maintain said securing portion in position within said access aperture of said article pocket to secure said article therewithin.

13. The security package as set forth in claim 12 and further, wherein said first lock means comprises at least one engagement aperture and said second lock means comprises at least one engagement member.

14. The security package as set forth in claim 13 and further, wherein said at least one engagement aperture includes opposing angled teeth members and said at least one engagement member includes opposing beveled surfaces for mating with a top surface of said angled teeth members.

15. The security package as set forth in claim 12, said surveillance tag pocket comprising a generally rectangular shaped box having first and second side walls, first and second end walls extending between said first and second side walls, wherein said enclosing portion of said lid member is hingedly attached to said second end wall.

* * * * *